United States Patent [19]

Yamaura

[11] Patent Number: 4,591,992
[45] Date of Patent: May 27, 1986

[54] METHOD AND SYSTEM FOR IDENTIFYING THE DIRECTION OF A FAULT IN A POWER LINE

[75] Inventor: Mitsuru Yamaura, Hachioji, Japan

[73] Assignee: Tokyo Shibaura Denki Kabushiki Kaisha, Kawasaki, Japan

[21] Appl. No.: 564,680

[22] Filed: Dec. 23, 1983

[30] Foreign Application Priority Data

Dec. 28, 1982 [JP] Japan .............................. 57-230022

[51] Int. Cl.$^4$ .......................... G01R 31/08; H02H 3/26
[52] U.S. Cl. ..................................... 364/483; 324/51; 324/52; 361/79; 361/84
[58] Field of Search ............... 364/480, 481, 483, 492; 324/51, 52; 361/80, 82, 79, 84

[56] References Cited

U.S. PATENT DOCUMENTS

| | | | |
|---|---|---|---|
| 3,569,785 | 3/1971 | Durbeck | 364/483 |
| 3,723,864 | 3/1973 | Ricard | 361/80 |
| 4,107,778 | 8/1978 | Nii et al. | 364/483 |
| 4,276,605 | 6/1981 | Okamoto et al. | 364/481 |
| 4,499,417 | 2/1985 | Wright et al. | 324/52 |

OTHER PUBLICATIONS

W. D. Breingan, "The Laboratory Investigation of a Digital System for the Protection of Transmission Lines", IEEE Paper F 77 052.4, Nov., 1976.

*Primary Examiner*—Errol A. Krass
*Attorney, Agent, or Firm*—Schwartz, Jeffery, Schwaab, Mack, Blumenthal & Evans

[57] ABSTRACT

In direction identification for a close-in fault when the voltage becomes very small, direction of the fault is determined from the discriminant D given by:

$$D = V_{k1} i_{k2} - V_{k3} i_{k4}$$

where $V_{k1}$, $V_{k3}$ represent sample values of the voltage at time points k1, k3, and $i_{k2}$, $i_{k4}$ represent either sample values of the current at time points k2, k4 or such sample values minimum current component values corresponding to pre-fault power flow. Here, k1=n−m−M; k2=n; k3=n−m; k4=n−M, where m represents the number of sampling operations over an interval equal to a multiple of half cycle of the system frequency, M represents an integer, and n represents a sampling time point. A signal for use, e.g., as a condition for tripping a circuit breaker is produced when the fault is found to be in the direction of the protection zone.

24 Claims, 25 Drawing Figures

METHOD AND SYSTEM FOR IDENTIFYING THE DIRECTION OF A FAULT IN A POWER LINE

BACKGROUND OF THE INVENTION

The present invention relates generally to a protective relay system and particularly to a method and system for identifying the direction of a fault in an electric power system, which are particularly advantageous in a close-in fault, i.e., where a fault occurs very close to the observation point.

Prior art direction-distance protective relays are formed to respond to a specified relationship between the vectors of a voltage and a current. In other words, they, in principle, resort to the fundamental wave of the system frequency. In a close-in fault, where the voltage becomes too small to serve as a basis for direction identification, so-called stored voltage data are used. But, here again, only the fundamental wave is used. Recently, however, wave distortion which occurs upon fault in an electric power system is no longer negligible, and now it is not necessarily right to identify the direction from the phase relationship between stored pre-fault voltage data and fault current data (i.e., the data of the current during the fault). This is because the phase relationship varies, in its appearance, from one instant to the next.

A method disclosed in a literature "IEEE paper No. F77052-4, Jan. 4, '77, W. D. Breingan et al." uses an algorithm which holds not only with fundamental waves but also with distorted waves. This method calculates a fictitious value of inductance from the stored voltage data, and the resultant fictitious value represents the inductance behind the observation point. If this value is positive, it is judged that the fault point is in front of the observation point as assumed. If the value is negative, it is judged that the fault point is behind the observation point, contrary to the assumption.

In the method described, it is presupposed that inductance is dominant behind the observation point. But the distorted waves which are now problematical are those due to free oscillation which occurs because of existence of capacitance of cables and shunt capacitors, in addition to inductance, behind the observation point. Therefore, the presupposition itself does not hold, and the problem is not yet solved.

SUMMARY OF THE INVENTION

An object of the invention is to solve the abovementioned problems.

Another object of the invention is to provide direction identifying method and system which enable reliable identification of the direction of a close-in fault even in a system where distorted current is caused by capacitance behind the observation point.

According to one aspect of the invention, there is provided a direction identification method for identifying the direction of a close-in fault, comprising the steps of:

(a) sampling a voltage and a current;
(b) judging whether or not the voltage is very small;
(c) determining the direction of a fault in accordance with the polarity of a discriminant D given by:

$$D = v_{k_1} i_{k_2} - v_{k_3} i_{k_4}$$

where $v_{kj}$ (j=1 or 3) represents a sample value of the voltage at a sampling time point kj, $i_{kj}$ (j=2 or 4) represents a value which is either a sample value of the current at a sampling time point kj or a difference value obtained by subtracting a value of a current component corresponding to pre-fault power flow from the sample value of the current at the sampling time point kj, and $k1 = n - m - M$
$K2 = n$
$K3 = n - m$
$K4 = n - M$ where m represents an integer equal to the number of sampling operations over an interval equal to a multiple of half cycle of the system frequency, M represents an integer, and n represents a sampling time point; and (d) producing, when the fault is found to be within a direction of a protection zone, a signal for use as a condition for operating a circuit breaker in the electric power system or for producing an alarm.

According to another aspect of the invention, there is provided a direction identification system for identifying the direction of a close-in fault, comprising (a) a device for sampling a voltage and a current;
(b) a device for judging whether or not the voltage is very small;
(c) a device for determining the direction of a fault in accordance with the polarity of a discriminant D given by:

$$D = v_{k_1} i_{k_2} - v_{k_3} i_{k_4}$$

where $v_{kj}$ (j=1 or 3) represents a sample value of the voltage at a sampling time point kj, $i_{kj}$ (j=2 or 4) represents a value which is either a sample value of the current at a sampling time point kj or a difference value obtained by subtracting a value of a current component corresponding to pre-fault power flow from the sample value of the current at the sampling time point kj, and $k1 = n - m - M$
$k2 = n$
$k3 = n - m$
$k4 = n - M$ where m represents an integer equal to the number of sampling operations over an interval equal to a multiple of half cycle of the system frequency, M represents an integer, and n represents a sampling time point; and (d) a device for producing, when the fault is found to be within a direction of a protection zone, a signal for use as a condition for operating a circuit breaker in the electric power system or for operating an alarm device.

DESCRIPTION OF PREFERRED EMBODIMENTS

Embodiments of the invention will now be described with particular reference to the drawings.

Figure 1:
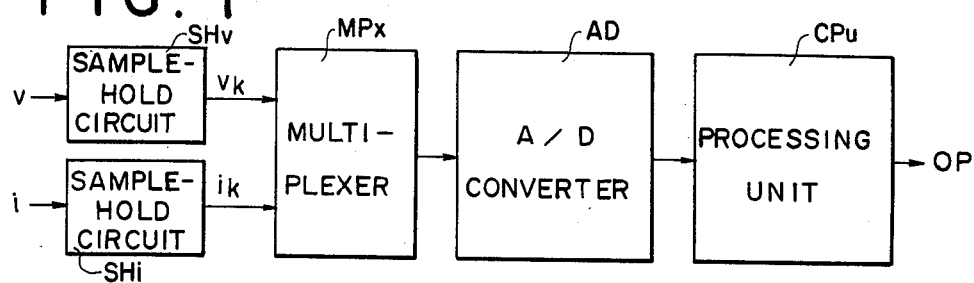
FIG. 1 is a block diagram showing a digital protective relay to which the invention is applied.

FIG. 1 shows a digital protective relay to which the invention is applicable. In FIG. 1, an input voltage v and an input current i are sampled by sample-hold circuits SHv, SHi, respectively, then multiplexed by a multiplexer MPX, and digitized by an analog-to-digital converter AD. The resultant digital values are applied to an operation unit CPU, which outputs the result OP of the operation. The sampled values of the voltage v and the current i are represented by $v_k$ and $i_k$, but those references $v_k$ and $i_k$ will also be used to represent the digital values outputted by the converter AD. Moreover, it should be noted that the description will be confined to direction identification although the operation unit CPU itself has such other functions as that of distance relay.

Figure 2:
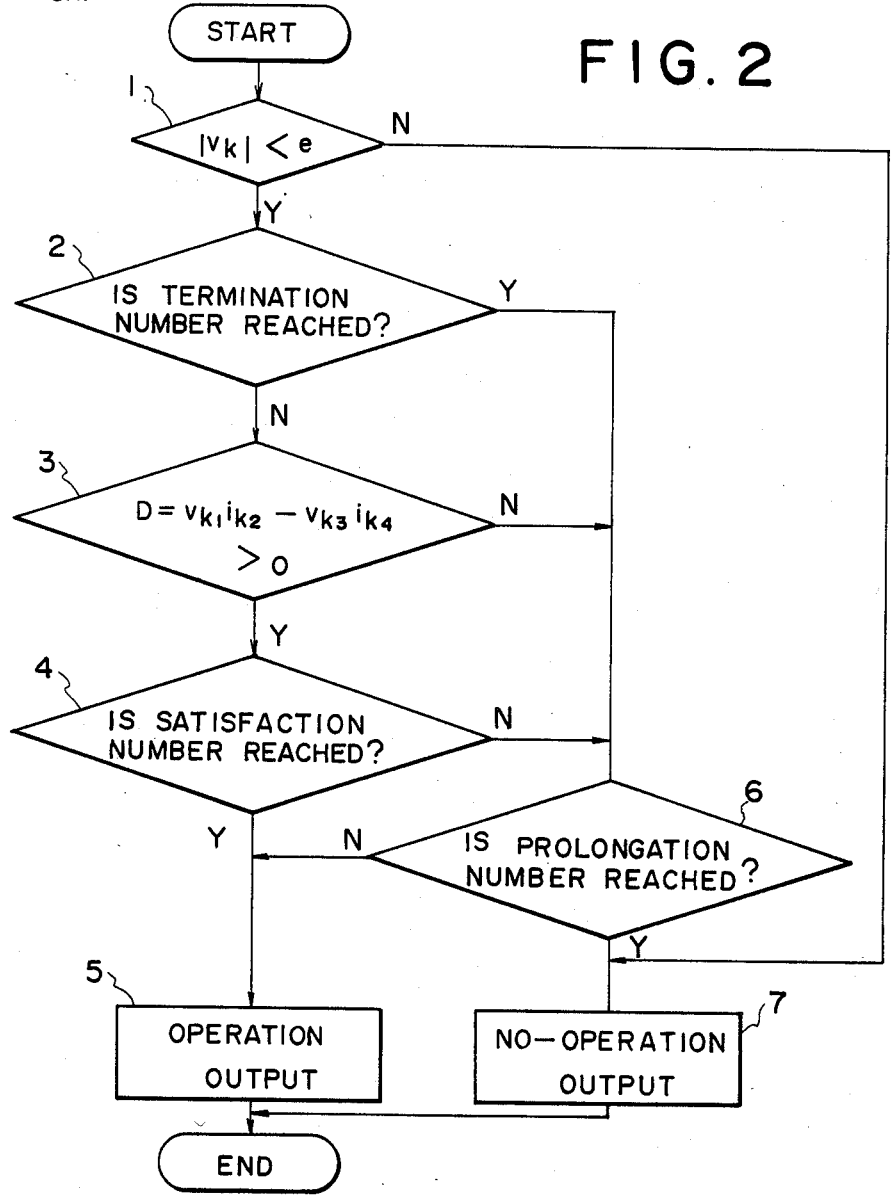
FIG. 2 is a flowchart showing an embodiment of the invention.

FIG. 2 is a flow chart showing an embodiment of direction identification according to the invention. The operation of FIG. 2 is initiated at a certain time interval, e.g., each time the sampling operation is completed.

At a step 1, judgement is made as to whether the absolute value of the sample $v_k$ is smaller than a predetermined value e. The value e is a threshold to distinguish between presence and absence of a (significant) voltage. If the voltage is larger than e, the direction identification is made in any of the conventional or normal ways. More particularly, with a voltage of a sufficient magnitude, distorted waves of current are accompanied with distorted waves of voltage, so that direction identification can be made in any known manner, i.e., without recourse to the invention, so that description of operation to be made under such circumstances will not be made.

If, therefore, the answer at the step 1 is negative N ($v_k \geq e$), the processing featuring the invention is not necessary (a known method can be adopted), so that the procedure goes to a step 7, where no-operation output is issued and the procedure is terminated.

If the answer at the step 1 is affirmative Y, the procedure goes to a step 2, where judgement is made whether the predetermined number of repetitions of the operation of FIG. 2 for the termination of the judgement (hereinafter referred to as termination number) is reached. This is to make effective the algorithm featuring the invention only during a certain period immediately after the voltage has fallen to a very small level. The reason will be described in detail later.

If the termination number is not reached, direction identification is made at a step 3. The direction identification is made in accordance with a quantity or discriminant D given by:

$$D = v_{k1} i_{k2} - v_{k3} i_{k4} \tag{1}$$

where $v_{k1}$, $v_{k3}$ are sampled values of the voltage at sampling instant k1, k3, respectively, and $i_{k2}$, $i_{k4}$ are sampled values of the current at sampling instant k2, k4, respectively. k1, k2, k3, k4 are given by:

$k1 = n - m - M$
$k2 = n$
$k3 = n - m$
$k4 = n - M$

Here, n denotes a sampling instant within a period immediately after the voltage has fallen to a very small value, i.e., $|v_k| < e$, m denotes the number of sampling operations during an interval equal to a multiple (which includes "1") of a half cycle of the system frequency, and M denotes any integer, typically a small value such as 1 or 2. In the illustrated embodiment, the number of sampling operations per one full cycle of the system frequency is an integer, as is usual in digital protective relays.

Figure 16:
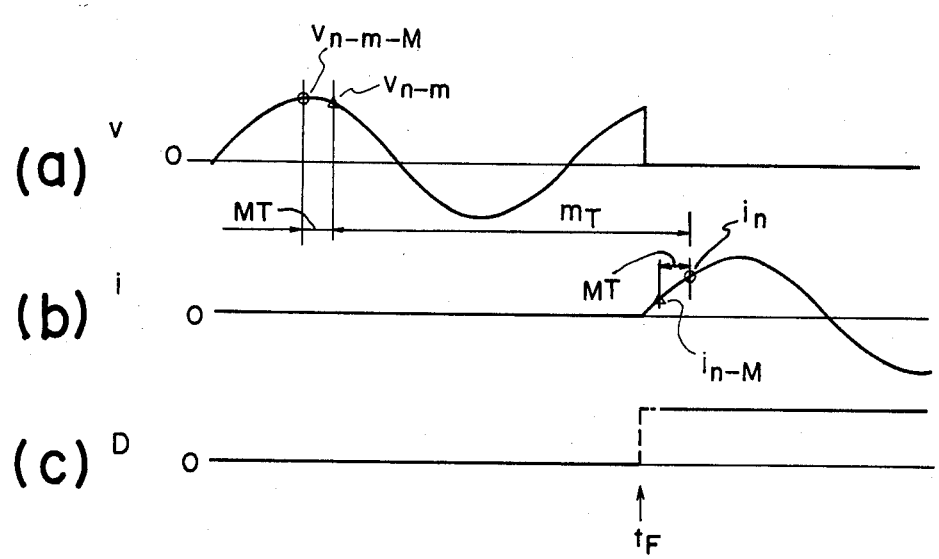
FIGS. 16(a)–16(c) are diagrams showing waveform of the voltage and the current upon occurrence of a fault and used to describe the significance of the equation for the discriminant D.

Significance of the equation (1) is explained with reference to FIG. 16. It is assumed that a fault occurred at a time point $t_F$. The discriminant D for the sampling time point n immediately after the occurrence of a fault is determined using the sample values of $i_n$ and $i_{n-M}$ (M being a small number, typically 1 or 2) and $v_{n-m}$ and $v_{n-m-M}$, i.e., sample values before the occurrence of the fault. The discriminant D would be "0" until the occurrence of the fault, and a positive value after the occurrence of the fault. It would be a fixed value as illustrated if there is no distortion. It is however normally a value varying with time, as will be exemplified later, due to distortion.

If, at the step 3, the discriminant D is positive, the fault is identified to be in the direction of the protection zone (hereinafter referred to as protection direction) for the reason described later. The procedure then goes to a step 4, where judgement is made as to whether the predetermined number of repetitions of satisfaction for production of an operation output (hereinafter referred to as satisfaction number) is reached. If the answer is affirmative Y, then at a step 5, operation output is issued. This operation output is used as a condition for tripping a circuit breaker, not shown, provided to disconnect the transmission line to be protected or for operating an alarm device, not shown, to produce an alarm. The step 4 is to avoid malfunction due to instantaneous noise, but also production of an operation output based on a judgement carried out when the sampled instantaneous value is zero or about zero. The satisfaction number is set for example at 2.

When the termination number at the step 2 is reached, i.e., a predetermined period expires after the voltage fell to a very small value, the discriminant of the equation (1) is no longer reliable, so that the entry to the step 3 is terminated and the procedure goes to a step 6 where judgement is made as to whether the predetermined number of repetitions of the operation of FIG. 2 for the prolongation of the production of an operation output (hereinafter referred to as prolongation number) is reached. Similarly, when the discriminant D is not found positive at the step 3, or when the satisfaction number is not reached at the step 4, the procedure goes to the step 6. The step 6 is for prolonging the operation once the operation is started. More particularly, the step 6, which is entered when there is no positive judgement that the fault is in the protection direction, is for maintaining the operation output for a certain time interval after there is a positive judgement that the fault is in the protection direction, i.e., the answer at the step 4 is affirmative. In other words, the function of the step 6 is like that of an off-delay timer. This technique is often adopted in a protective relay system so that further description thereof is omitted. When the prolongation number is found reached at the step 6, the procedure goes to the step 7 to produce no-operation output, and the procedure is terminated.

Figure 3A:
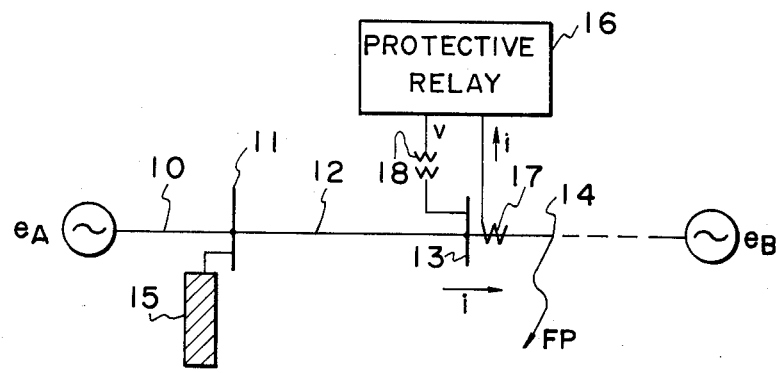
FIGS. 3(a) and 3(b) are single line diagrams showing examples of electric power system with a protective relay system.
Figure 3B:
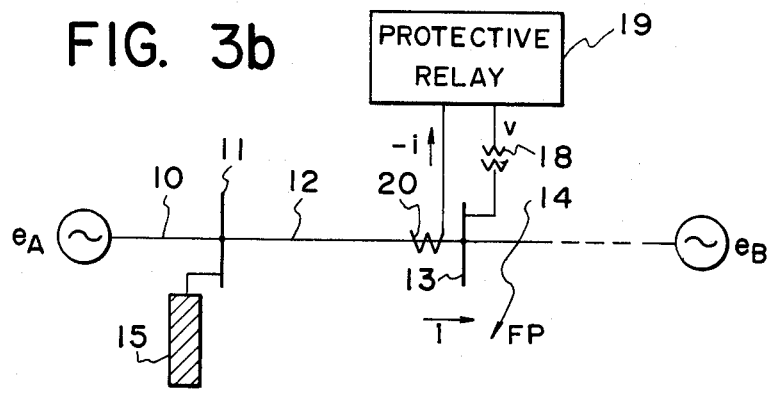

FIGS. 3(a) and 3(b) are single line diagrams showing the electric power system and a protective relay system. In FIG. 3(a), a power source $e_A$ is connected through a transmission line 10 to a bus line 11, which in turn is connected through a transmission line 12 to a bus line 13, which in turn is connected through a transmission line 14 to another power source $e_B$. Also connected to the bus line 11 is a cable transmission line 15. A protective relay 16 is in charge of protection of the transmission line 14 and is positioned near the bus line 13, and receives, from a current transformer 17 and a voltage transformer 18, a secondary current i and a secondary voltage v. For simplicity of description, the transformation ratios of the transformers are assumed to be both "1", that is the current through the transmission line 14 is i and the voltage on the bus line 13 is v. The fault point FP is assumed to be on the transmisson line 14 and is very close to the bus line 13. Thus the fault point FP is with reference to the relay 16, in the protection direction or forward direction and is very close.

FIG. 3(b) shows a system similar to that of FIG. 3(a), except that the fault point FP is behind the protective relay 19, which is in charge of the protection of the transmission line 12. In this case, the protective relay 19 receives a voltage v and a current −i through the transformers 18 and 20. For the sake of simplicity, it is assumed that the current i flowing through the transmission line 14 is identical to that flowing through the transmission line 12, although those currents typically differ from each other. Such assumption will not make it difficult to have an understanding on the situation where the currents differ. This will be further described later with reference to FIGS. 8 and 9. The main purpose of the following description is to explain that the discriminant D can be used to distinguish the direction of the fault, i.e., it is, e.g., positive for the protective relay 16 and it is, e.g., negative for the protective relay 19.

Figure 4A:
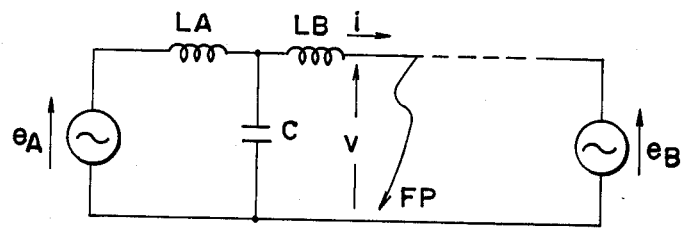
FIGS. 4(a), 4(b) and 4(c) are equivalent circuit diagrams used for analyzing the voltage and the current during a fault.
Figure 4B:
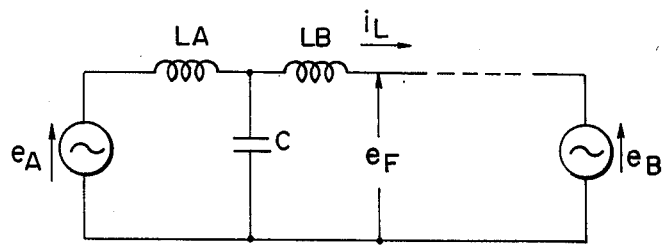
Figure 4C:
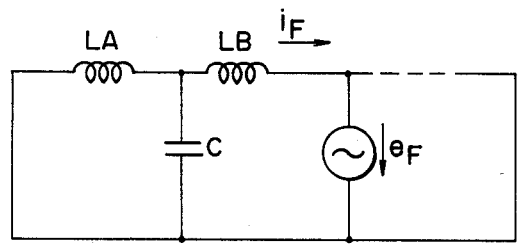

FIGS. 4(a)–4(c) are equivalent circuit diagrams used for analyzing the voltage and the current at the time of a fault in FIGS. 3(a) and 3(b). LA denotes the inductance of the transmission line 10, LB denotes the inductance of the transmission line 12, C denotes the capacitance of the cable transmission line 15, $i_L$ denotes a current corresponding to the pre-fault power flow, $i_F$ denotes the fault component of the current, and $e_F$ denotes the pre-fault voltage. The remaining reference characters have the same significances as in FIGS. 3(a), 3(b). In the equivalent circuits of FIGS. 4(a)–4(c), all the elements contributing to losses are all neglected. But, as is well known, sufficient approximation is obtained for the purpose of determining the voltage and the current distortions which occur immediately after the fault. For the same reason, the inductance of the cable transmission line is neglected.

FIG. 4(a) is a directly obtained equivalent circuit for the time of a fault, and can be dissolved into two equivalent circuits of FIG. 4(b) and FIG. 4(c), by the well-known principle of superposition. FIG. 4(b) shows a current $i_L$ corresponding to the power flow which is maintained regardless of the fault, and a pre-fault voltage $e_F$ at the fault point FP. FIG. 4(c) shows a fault current component $i_F$ which is equal to a current which would flow if the power sources $e_A$, $e_B$ are removed and short-circuited and a reverse voltage equal to the pre-fault voltage $e_F$ is applied at the fault point FP. The fault current component $i_F$ is calculated from FIG. 4(c).

It is assumed that a fault occurred at a time point t=0, and $e_F$ is given by:

$$e_F = E \sin(\omega t + \theta) \qquad (2)$$

where
  E represents the amplitude of the voltage,
  $\omega$ represents the angular frequency of the system,
  $\theta$ represents the initial phase.

Then, the fault current component $i_F$ is given by:

$$i_F = \alpha^{-1} \left\{ \frac{\alpha(e_F)}{SLB + \dfrac{1}{SC + \dfrac{1}{SLA}}} \right\} = \qquad (3)$$

$$\alpha^{-1} \left\{ \frac{E(\omega\cos\theta + S\sin\theta)(S^2 + \omega_D^2)}{(S^2 + \omega^2)SLB(S^2 + \omega_C^2)} \right\}$$

S: Laplace variable $$\omega_C^2 = \left(\frac{1}{LA} + \frac{1}{LB}\right)\frac{1}{C}, \quad \omega_D^2 = \frac{1}{LAC}$$

The equation (3) can be transformed as set forth below and $i_F$ is given as a function of time.

$$i_F = \frac{E}{LB} \alpha^{-1} \left\{ \frac{\omega_D^2 \cos\theta}{\omega\omega_C^2} + \frac{(\omega_D^2 - \omega^2)(\omega\sin\theta - S\cos\theta)}{\omega(\omega_C^2 - \omega^2)(S^2 + \omega^2)} + \right. \qquad (4)$$

$$\left. \frac{(\omega_C^2 - \omega_D^2)(\omega_C^2 \sin\theta - S\omega\cos\theta)}{\omega_C^2(\omega_C^2 - \omega^2)(S^2 + \omega_C^2)} \right\}$$

$$= \frac{E}{LB} \left\{ \frac{\omega_D^2 \cos\theta}{\omega\omega_C^2} - \frac{(\omega_D^2 - \omega^2)}{\omega(\omega_C^2 - \omega^2)} \cos(\omega t + \theta) - \right.$$

-continued $$\frac{\omega_C{}^2 - \omega_D{}^2}{\omega_C(\omega_C{}^2 - \omega^2)} \left( \frac{\omega}{\omega_C} \cos\theta \cos\omega_C t - \sin\theta \sin\omega t \right) \Big\} $$

or, alternatively, $$i_F = \frac{E(\omega_D{}^2 - \omega^2)}{LB\omega(\omega_C{}^2 - \omega^2)} \Big\{ -\cos(\omega t + \theta) + \qquad (5)$$

$$\left(1 + F\frac{\omega}{\omega_C}\right) \cos\theta - FH\cos(\omega_c t + \theta_c) \Big\}$$

$$F = \frac{\omega(\omega_C{}^2 - \omega_D{}^2)}{\omega_C(\omega_D{}^2 - \omega^2)}$$

$$H = \sqrt{\sin^2\theta + \frac{\omega^2}{\omega_C{}^2}\cos^2\theta}$$

$$H\cos\theta_C = \frac{\omega}{\omega_C}\cos\theta$$

$H\sin\theta_C = \sin\theta$
If $\theta = \pm\pi/2$ in equation (5), $$i_F = \frac{E(\omega_D{}^2 - \omega^2)}{LB\omega(\omega_C{}^2 - \omega^2)} \{\sin\omega t + F\sin\omega_C t\} \qquad (6)$$

$H = 1, \cos\theta_C = 0, \sin\theta_C = \pm 1 \therefore \theta_C = \pm\pi/2$

The factor F represents the content in ratio of the free oscillating components of the angular frequency $\omega_C$ relative to the fundamental wave component.

The total current i of FIG. 4(a) can be determined from the fault current component $i_F$ thus determined and the current $i_L$ corresponding to the power flow.

$$i = i_L + i_F \qquad (7)$$

Figure 5:
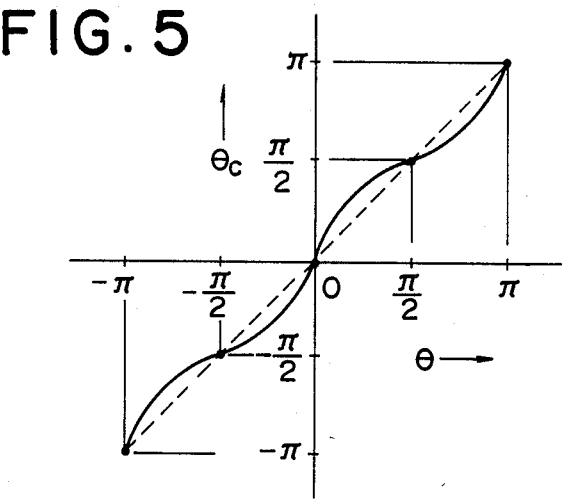
FIG. 5 is a characteristic diagram showing a relationship between the initial phase $\theta$ and $\theta_C$.

FIG. 5 is a characteristic diagram showing the relationship between $\theta$ (initial phase) and $\theta_C$. As mentioned above, $\theta_C = \theta$ when $\theta = \pm \zeta/2$. It will be readily appreciated from the equation (5) that $\theta_C = \theta$ also when $\theta = 0$ and $\theta = \pm\zeta$. For other initial phases, the relationship is as shown by a solid line in FIG. 5.

From FIG. 5, it is seen that $\theta_C \approx \theta$ for all other initial phases. It is also seen from the equation (3) that $\omega_C > \omega_D$. In addition, usually, the inductance LA and the capacitance C are not abnormally large, so that $\omega_D > \omega$. Therefore, F (in the equation (5))>0 and

H>0 from the equation (5).

Thus, for any initial value $\theta$ of the phase, the fundamental wave component and the free oscillating component of the fault current $i_F$ are substantially of the same phase during an interval immediately after the fault.

Where there is only the fundamental wave component, the discriminant D is positive when the current is lagging behind the voltage, and the discriminant D is negative when the current is leading. This is explained below.

In general, if the amplitudes of the voltage v and the current i are represented by V and I, and their phases are represented by $\alpha$ and $\alpha - \phi$, then $$v = V \sin(\omega t + \alpha) \qquad (8)$$

$$i = I \sin(\omega t + \alpha - \phi)$$

Assuming that the sampling interval is T and substituting the equation (8) in the equation (1), we obtain:

$$D = VI[\sin\{\omega(n - m - M)T + \alpha\} \sin(\omega nT + \alpha - \phi) - \qquad (9)$$

$$\sin\{\omega(n - m)T + \alpha\}\sin\{\omega(n - M)T - \phi\}].$$

By the above-described definition $\omega mT$ is a multiple of $2\pi$. The equation (9) can therefore be transformed to:

$$D = VI \sin M\omega T \sin\phi \qquad (10)$$

If M is selected to be any fixed integer and, at the same time, to be such a number that makes $\sin M\omega T$ positive, then $D > 0$ (positive) when $0 < \phi < \pi$, i.e., the current is lagging and $D < 0$ (negative) when $0 > \phi > -\pi$, i.e., the current is leading.

If such consideration is applied to the voltage $e_F$ of the equation (2) and the fundamental wave component $i_{F1}$ of the current $i_F$ of the equation (5), then:

$$i_{F1} = -I_{F1}\cos(\omega t + \theta) = I_{F1}\sin\left(\omega t + \theta - \frac{\pi}{2}\right) \qquad (11)$$

$$I_{F1} = \frac{E(\omega_D{}^2 - \omega^2)}{LB\omega(\omega_C{}^2 - \omega^2)}$$

The phase angle $\phi$ of the equation (10) therefore corresponds to $\pi/2$, and hence, $$D = EI_{F1} \sin M\omega T \qquad (12)$$

If, therefore, $i = i_{F1}$, then D is positive. The free oscillating component of the current $i_F$ of the equation (5) has a roughly identical initial phase, so that it has a similar tendency during an interval immediately after $t = 0$. But as it has a different frequency, then it later begins to have a different polarity. In addition, $$\left(1 + F\frac{\omega}{\omega_C}\right) \cos\theta$$

in { } of the equation (5) represents a DC current component, and a DC current component generally tends to obstruct rapid change of a current, so that its effect is merely to retard the rise of the discriminant D and does not have any significant effect on the polarity of D. Fuller appreciation and confirmation will be had when the later described examples are discussed.

The current i consists of the fault current component $i_F$ and the current $i_L$ corresponding to the prefault power flow, as is seen from the equation (7), but the effect by the latter can be usually neglected. The reason for this is next described. If the delay of phase of the current $i_L$ with reference to $e_F$ is represented by $\beta$, and the amplitude is represented by $I_L$, that part $D_L$ of D which corresponds to such component is given by:

$$D_L = EI_L \sin M\omega T \sin \beta \tag{13}$$

$I_L$ of the equation (13) is usually smaller than $I_{F1}$ of the equation (12), and the current $i_L$ is roughly in phase with the pre-fault voltage $e_F$, so that the phase $\beta$ is smaller than $\pi/2$. $D_L$ is therefore usually negligible.

Now, further description is made on the integer m in the equation (1). As was mentioned, the voltage $e_F$ in FIG. 4 is a voltage assumed as if the pre-fault voltage v is maintained. To have an instantaneous value of $e_F$, a value sampled in advance by a multiple of a cycle (period) of the system frequency is used. This is what m signifies. This technique is well known as the method of stored voltage.

Figure 6A:
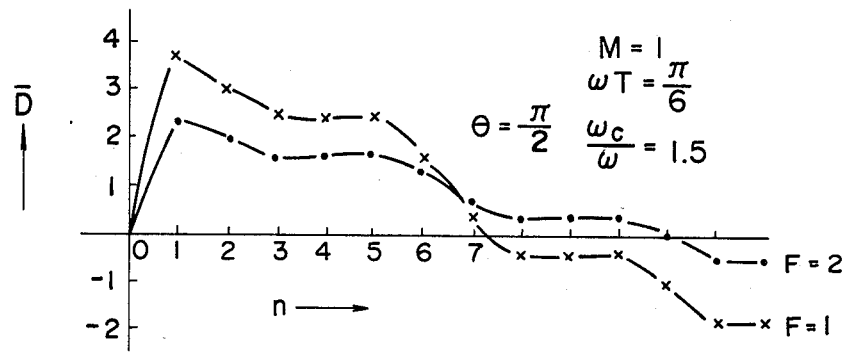
FIGS. 6(a), 6(b), 6(c), 7(a), 7(b) and 7(c) are diagrams showing variation of the discriminant D under various conditions.
Figure 6B:
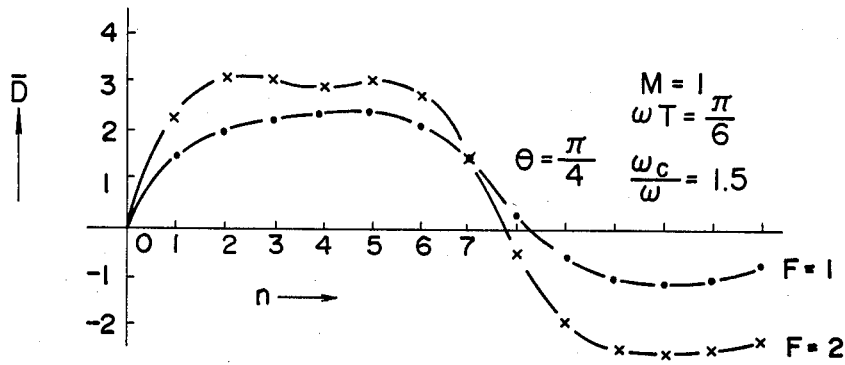
Figure 6C:
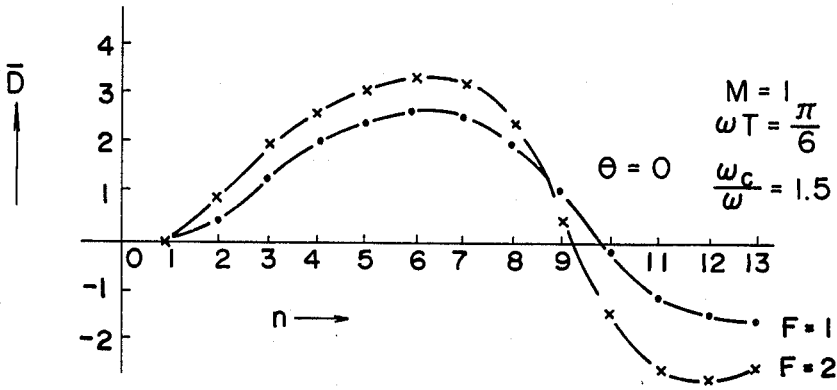

FIG. 6 shows examples of variation of the discriminant D. In the examples in this Figure, $M=1$, $\omega T=\pi/6$, $\omega C/\omega=1.5$, and $F=2$ or 1. FIG. 6 shows at (a), (b), and (c) the examples for $\theta=\pi/2$, $\pi/4$, 0, respectively. The time point n is taken on the abscissa while a normalized value $\overline{D}$ of the discriminant D is taken on the ordinate. The normalized value $\overline{D}$ is given by:

$$\overline{D} = D/EI_{F1} \sin M\omega T \tag{14}$$

It should however be noted that in deriving the equation (14), the component due to the current $i_L$ corresponding to the pre-fault power flow is negligible for the reason mentioned above, so that $i_L$ forming part of i in the equation (7) is neglected. That is, the equation (14) is obtained using only $i_F$ of the equation (5).

It is seen from the Figure that the discriminant D is positive during the initial period regardless of the value of $\theta$. It is also seen from FIG. 6(c) that the rise of the discriminant D is delayed a little, as described above, where $\theta=0$ and the DC current component is maximum. The fault current component $i_F$ contains the free oscillating component, so that the discriminant D becomes negative when certain time elapses (i.e. n increases) and the discriminant D thereafter oscillates.

Figure 7A:
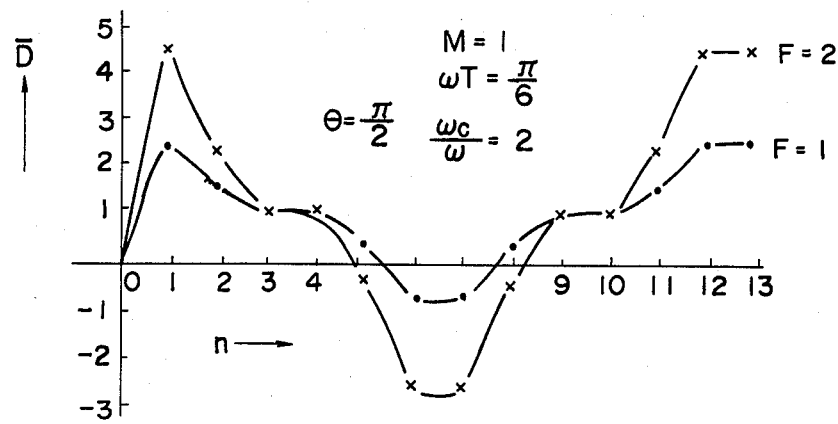
Figure 7B:
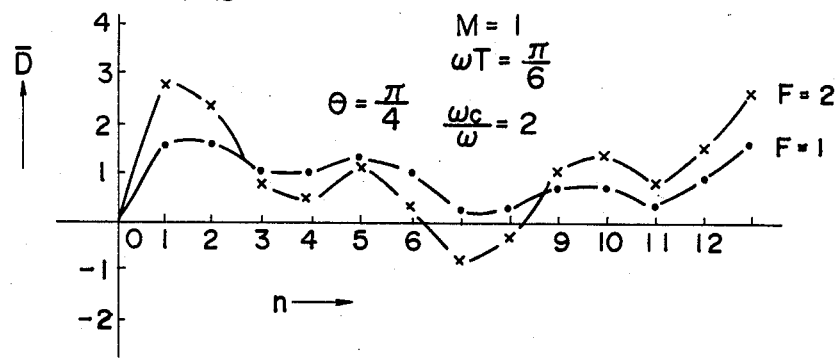
Figure 7C:
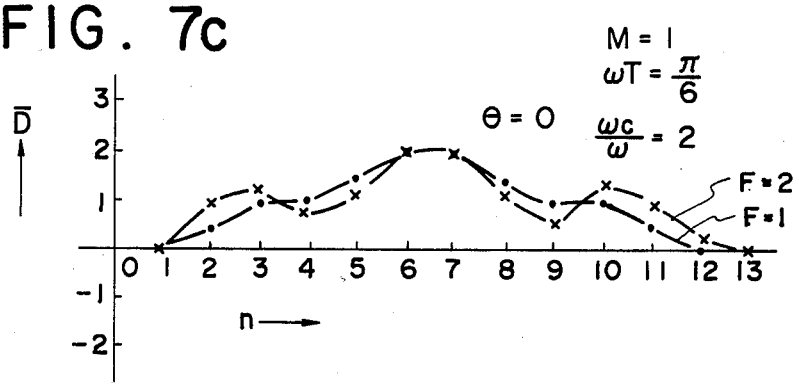

FIG. 7 shows other examples of the variation of the discriminant D. The parameters are identical with those of FIG. 6 except $\omega C/\omega = 2$. Again, the discriminant D is positive during the initial period of the occurrence of a fault, and thereafter oscillates.

Since the discriminant D is thus positive during the initial period of the occurrence of a fault and thereafter oscillates, it is necessary to terminate the judgement according to the discriminant D upon repetition of a certain number of times, i.e., upon elapse of a certain time interval. The step 2 of FIG. 2 is provided for this reason. Incidentally, it may be felt necessary to reduce the number of repetitions with increased free oscillating frequency. But this is not true since a higher frequency components are removed by a filter.

The description made so far concerns the protective relay 16 of FIG. 3(a). But as will be apparent, the relay 19 receives the current $-i$ instead of i and the voltage v the same as the relay 16, so that the discriminant D is negative during the initial period of the fault. The fault point is therefore identified as being behind the relay.

Figure 8:
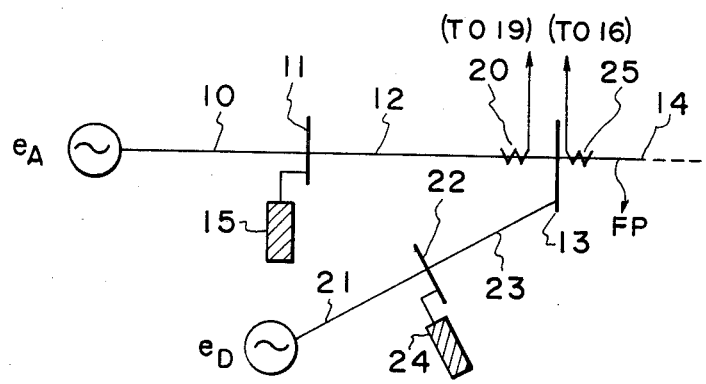
FIG. 8 is a single line diagram showing a further example of electric power system with a protective relay system.

FIG. 8 is another single line diagram which supplements FIG. 3. More specifically, it was assumed in FIG. 3 that no other transmission lines are connected to the bus line 13. This was to simplify the explanation. FIG. 8 illustrates a more general situation. Current transformers 20, 25 corresponding to those 20, 17 in FIG. 3 are both shown, and an additional power source $e_D$, transmission lines 21, 23, a bus line 22 and a cable transmission line 24 are added. The voltage transformer, etc. are omitted. Assuming that a fault occurs at a point FP in that part of the transmission line 14 very close to the bus line 13, as was assumed in discussing FIG. 3, consideration is given to relationships between the protective relays 16 and 19 which receive the current from the current transformers 20 and 25, respectively. The presupposition that the currents are of the same magnitude and of opposite direction does not hold. But the same principle is applicable. This is explained next.

Figure 9:
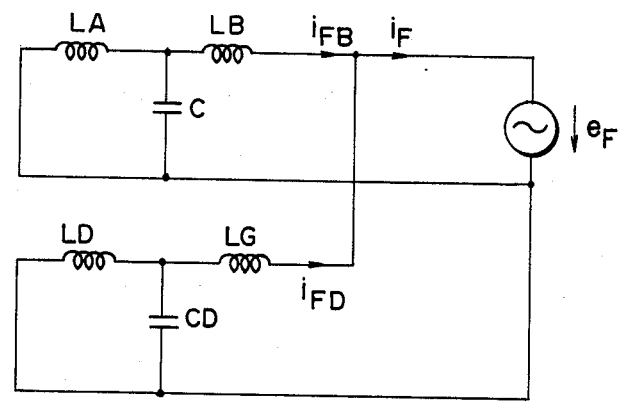
FIG. 9 is an equivalent circuit diagram used for analyzing the fault current component in the system of FIG. 8.

FIG. 9 is an equivalent circuit (corresponding to FIG. 4(c)) for determining the fault currents of FIG. 8. LD and LG denote the inductances of the transmission lines 21 and 23. CD denotes the capacitance of the cable transmission line 24. $i_F$, $i_{FB}$ and $I_{FD}$ denote the fault current components flowing through the transmission lines 14, 12 and 23. The fault current component $i_{FB}$ is the same as the fault current component $i_F$ of FIG. 4(c), so that description made above concerning the relay 19 with reference to FIG. 4 is applicable. The fault current component $i_F$ inputted to the relay 16 is given by:

$$I_F = i_{FB} + i_{FD} \tag{15}$$

The fault currents $i_{FD}$ and $i_{FB}$ have a similar characteristic to that described with reference to FIG. 4, so that the discriminant D also has a similar characteristic to that described with reference to FIG. 4.

If the cable transmission line 24 in FIG. 8 is not present, i.e., if the capacitance CD in FIG. 9 is not present, the fault current component $i_{FD}$ contains the fundamental wave component and a DC component, and does not contain any free oscillating component. But this does nothing but makes the judgement easier since the oscillation of the discriminant D is reduced. Thus, it is clear that the invention is not limited to the system of FIG. 3 but is applicable to any system.

Figure 10:
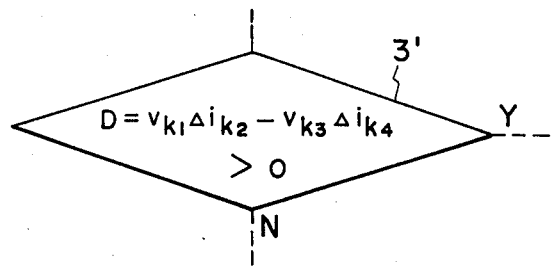
FIGS. 10 and 11 show modifications of one of the steps of FIG. 2.

As a modification, the step 3 of FIG. 2 may be replaced by a step 3' of FIG. 10. In this modification, the discriminant D is given by:

$$D = v_{k1}\Delta i_{k2} - v_{k3}\Delta i_{k4} \tag{16}$$

where $\Delta i_{k2} = i_{k2} - i_{(k2-m)}$,
$\Delta i_{k4} = i_{k4} - i_{(k4-m)}$ instead of the equation (1). It will be seen that the currents $i_{k2}$ and $i_{k4}$ during the fault are replaced by those values obtained by subtracting the pre-fault currents due to power flow. With such a modification, the effect of the pre-fault current due to power flow is suppressed. The principle of the invention is applicable even where the effect of the pre-fault current due to power flow is not negligible if the equation (1) is used.

Figure 11:
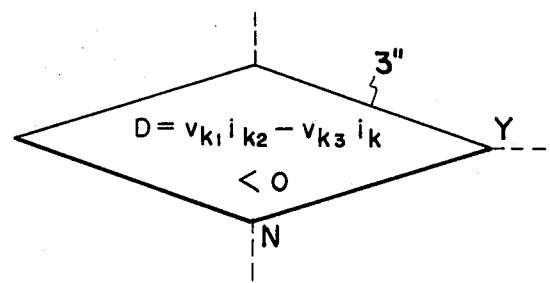

As another modification, the step 3 of FIG. 2 may be replaced by a step 3'' of FIG. 11. In this modification, the discriminant D is given by an equation which is, in appearance, the same as the equation (1), but the sample values used are of different sampling time points. That is, m of the equation is a number of sampling operations performed during an interval equal to an odd-number multiple (which includes "1") of a half cycle of the system frequency. The voltages $v_{k1}$ and $v_{k3}$ of this modification are of opposite polarity to those $v_{k1}$ and $v_{k3}$ of the embodiment of FIG. 2. The discriminant D is therefore negative where it should be positive with the embodiment of FIG. 2. If, in this modification, m is selected to be a number of sampling operations performed per one half cycle, the stored voltage data are of effective values during the initial half cycle of the fault occurrence, and thereafter become very small. As a result, unnecessary output is not produced and the judgement is on the safe side.

Figure 12:
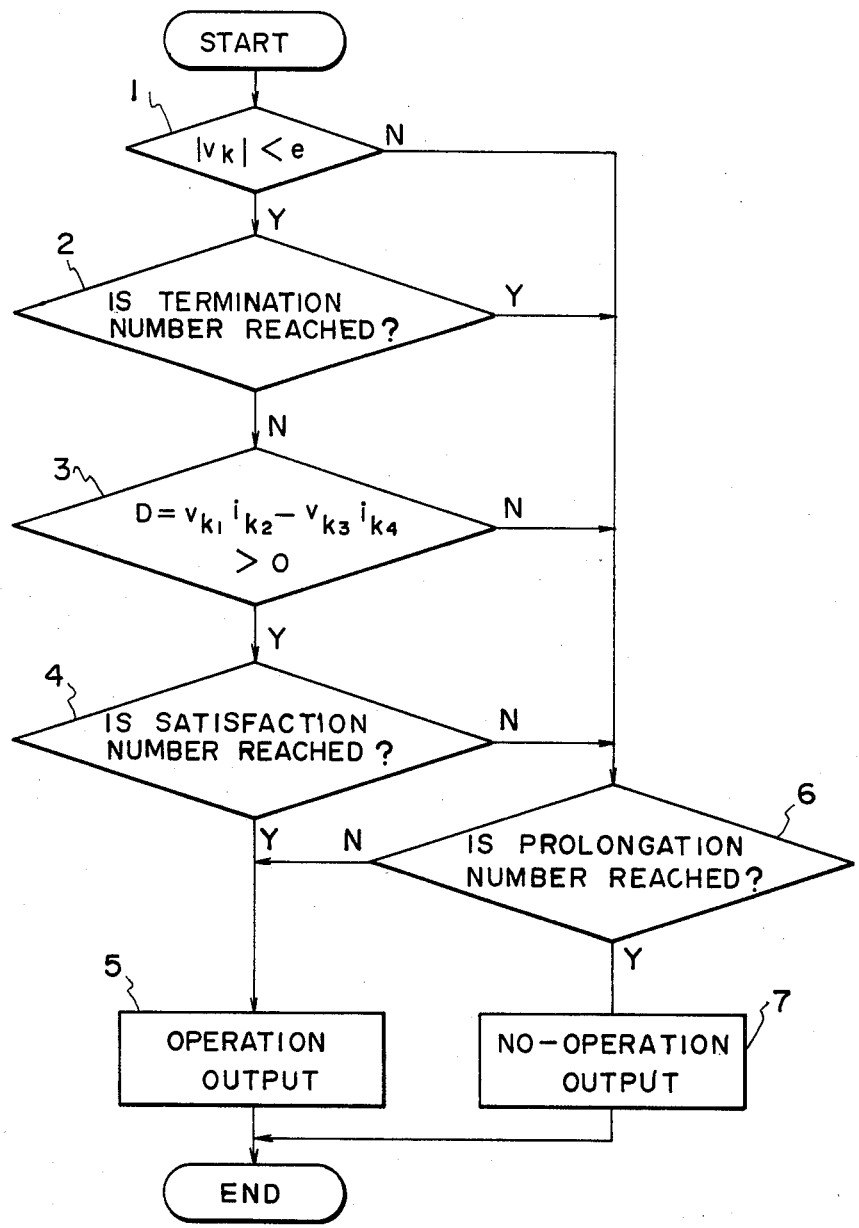
FIGS. 12 and 13 are flowcharts showing other embodiments of the invention.

FIG. 12 shows another embodiment of the invention. The operation performed at each step in FIG. 12 is identical to that at the step designated by the same reference numeral in FIG. 2. The difference is that the procedure goes to the step 6, rather than to the step 7, if the answer at the step 1 is negative N. This is to maintain an operation output for a certain number of repetitions once it is judged that a fault is in the protection direction. The choice between the embodiments of FIG. 2 and FIG. 12 can be made depending on the particular overall arrangement of the protective relay.

Figure 13:
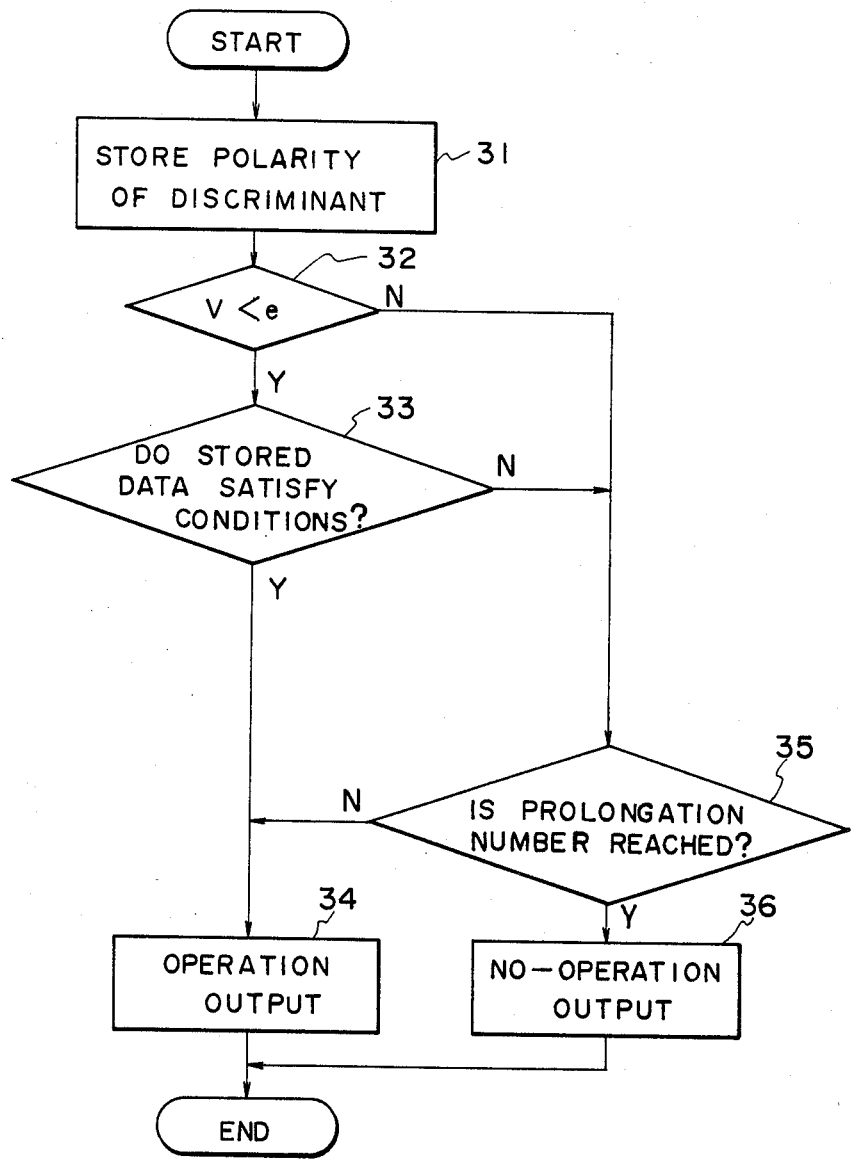

FIG. 13 shows a further embodiment of the invention. In this embodiment, data indicative of the time sequence of the results of the judgement as to the polarity of the discriminant D are stored and are later examined. Such an arrangement is useful when the amplitude V of the voltage is calculated by the well known algorithm of amplitude squared or the like in which the amplitude is determined from the sample values obtained at different time points, and hence determination is delayed until the last datum is available. The step 31 in FIG. 13 is to store the polarity of the discriminant D found as a result of the judgement. Any of the equations, including the equations (1), (16), described so far may be used to determine the discriminant D. The step 32 is to judge whether the voltage is a very small value. The voltage used here is not an instantaneous value as at the step 2 of FIG. 2, but an amplitude V determined by, e.g., the algorithm of amplitude squared. When it is found at the step 32 that the voltage is very small, the procedure goes to the step 33 where the stored data are examined, and judgement is made as to whether the contents of the stored time sequence of the polarity of the discriminant D satisfies the condition for operation, i.e., whether or not the stored data indicate that the discriminant D continues to assume the specific polarity (representing the protection direction) for a predetermined satisfaction number. If the answer at the step 33 is affirmative Y, then, at a step 34, an operation output is produced. If the answer at the step 32 or 33 is negative N, the procedure goes to a step 35. The step 35 and a step 36 are similar to the steps 6 and 7, so that description thereof is omitted. It will be seen that the embodiment of FIG. 2 uses the sampled instantaneous value of the voltage for the judgement as to whether the voltage is a very small value. Such judgement involves, in effect, comparison of the amplitude of the voltage with a reference value which varies depending on the phase angle at which a fault occurs. This arrangement is practically satisfactory. But if it is desired to compare the amplitude with a fixed reference, the embodiment of FIG. 13 is more appropriate. The judgement at the step 32 is delayed, from the time point at which the voltage measured is actually taking place, by about ¼ cycle. To minimize the effect of the delay and to reduce the overall response time, the judgement as to the polarity of the discriminant D (i.e., the judgement of the fault direction) is repeated and stored at the step 31, so that the judgement, at the step 33, as to whether an operation output should be produced can be made instantly after the voltage is found very small, at the step 32.

Figure 14:
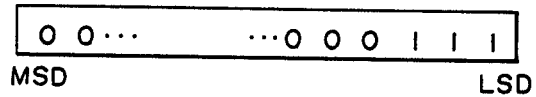
FIG. 14 shows a format of stored data.

FIG. 14 shows an example of a format of the stored data indicating the time sequence of the results of the judgement as to the polarity of D. "1" in each digit signifies that the polarity of D indicates the protection direction. The leftmost digit (MSD: most significant digit) indicates the oldest result, while the rightmost digit (LSD: least significant digit) indicates the latest result. Each time a new result of judgement is obtained, the data of all the digits are shifted leftward and the content of the left digit is removed. When the voltage amplitude V is found very small, then the stored data are examined. The examination is made not necessarily on all the data shown in FIG. 14, but is limited to those determined for the time points during a period immediately after the estimated time point of occurrence of a fault. If "1" is found to continue for a predetermined number of digits, e.g., for two digits, it is then judged that the condition for operation is satisfied. In the illustrated examples, "1" continues for three digits (from the LSD), i.e., more than two digits, so that satisfaction of the condition is recognized.

Figure 15:
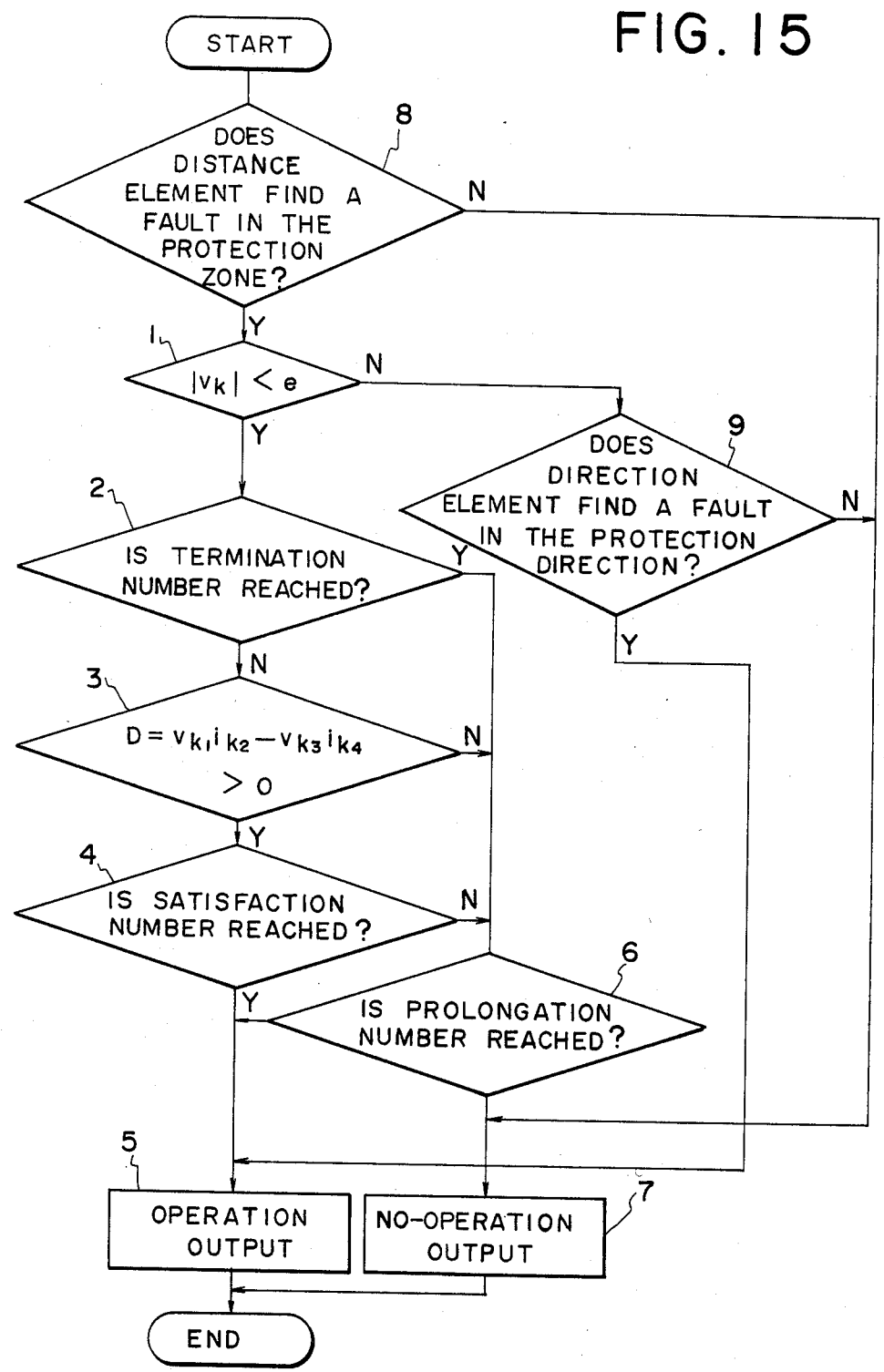
FIG. 15 is a flowchart showing a further embodiment of the invention.

FIG. 15 shows a further embodiment of the invention in which the direction identification featuring the invention is combined with a distance relay element. The steps 1–7 are similar to those of FIG. 2. The step 8 is a well known distance element. If the result of the judgement at the step 8 is "no-operation" N, then the procedure goes to the step 7 to produce no-operation output. If the answer at the step 8 is "operation" Y, the procedure goes to the step 1, where the judgement on the voltage is made. If the answer at the step 1 is affirmative Y (very small), the following procedure is similar to that of FIG. 2. If the answer at the step 1 is negative N, the procedure goes to a step 9. The step 9 is a well known direction element which is reliable when the voltage is not very small. Depending on whether the answer at the step 9 is "operation" Y or "no-operation" N, the procedure goes to the step 5 or the step 7. Remaining procedure is the same as in FIG. 2. Thus, the direction identification is made by a conventional method when the voltage is of an adequate magnitude while the direction identification is made by the method featuring the invention when the voltage is very small.

The embodiment of FIG. 15 is just an example of combination of the method featuring the invention and a conventional method. It should be noted that various other combinations can be obtained without departing from the scope of the invention.

As has been described, the invention utilizes the fact that the free oscillating component and the fundamental wave component of the fault current have roughly the same initial phase, and performs direction identification from the phase relationship of them with the pre-fault voltage. The invention thereby makes it possible to accomplish reliable direction identification of a close-in fault in a system with a large distortion.

What is claimed is:

1. A direction identification method for identifying the direction of a close-in fault, comprising the steps of:
   (a) sampling a voltage and a current;
   (b) judging whether or not the voltage is less than a predetermined threshold;
   (c) determining the direction of a fault in accordance with the polarity of a discriminant D given by:

$$D = v_{k_1}i_{k_2} - v_{k_3}i_{k_4}$$

where $v_{kj}$ (j=1 or 3) represents a sample value of the voltage at a sampling time point kj, $i_{kj}$ (j=2 or 4) represents a value which is a function of a sample value of the current at a sampling time point kj, and $k1 = n - m - M$
$k2 = n$
$k3 = n - m$
$k4 = n - M$ where m represents an integer equal to the number of sampling operations over an interval equal to a multiple of a half cycle of the system frequency, M represents an interger, and n represents a sampling time point;

wherein the determination of the direction in accordance with the polarity of the discriminant D is made for sampling time points n within a predetermined time interval from occurrence of a fault; and (d) producing, when the voltage is less than said predetermined threshold and the fault is found to be within a direction of a protection zone, a signal for use as a condition for triggering a fault responsive device.

2. A method according to claim 1, wherein said integer m is equal to the number of sampling operations over an interval equal to a multiple of a full cycle of the system frequency.

3. A method according to claim 2, wherein said multiple is 1.

4. A method according to claim 1, wherein said integer m is equal to the number of sampling operations over an interval equal to an odd number multiple of a half cycle of the system frequency.

5. A method according to claim 4, wherein said multiple is 1.

6. A method according to claim 1, wherein said difference value is used as said value $i_{kj}$ and a sample value at a sampling time point of n−m is used as said value of a current component corresponding to prefault power flow.

7. A method according to claim 1, further comprising the step of prolonging, for a certain time interval, the production of said signal at said step (d), once the fault is found to be in the direction of the protection zone at said step (c) even if it is found thereafter that the voltage is not very small or that the fault is not in the direction of the protection zone.

8. A method according to claim 1, wherein the judgement at said step (b) is made using a sampled instantaneous value of the voltage, and the determination of the direction in accordance with the polarity of the discriminant D at said step (c) is made for sampling time points n within a certain time interval from the time when the sampled instantaneous value of the voltage becomes very small.

9. A method according to claim 1, wherein the polarity of the discriminant D is successively determined and stored in time sequence, and the determination of the direction in accordance with the polarity at said step (c) is initiated, when the voltage is found to be very small at said step (b), and is performed by referring to the stored polarities determined for the sampling time points n within a certain time interval from an estimated time point of occurrence of a fault.

10. A method according to claim 9, wherein the judgement at said step (b) is made using an amplitude of the voltage.

11. A method according to claim 1 wherein $i_{kj}$ represents a difference value obtained by subtracting a value of a current component corresponding to pre-fault power flow from the sample value of the current at the sampling point kj.

12. A method according to claim 1 wherein said predetermined time is less than the time required for the polarity of said determinant to change such that the polarity of said determinant used for determining fault direction is an initial value.

13. A direction identification system for identifying the direction of a close-in fault, comprising:

(a) means for sampling a voltage and a current;

(b) means for judging whether or not the voltage is less than a predetermined threshold.

(c) means for determining the direction of a fault in accordance with the polarity of a discriminant D given by:

$$D = v_{k_1}i_{k_2} - v_{k_3}i_{k_4}$$

where $v_{kj}$ (j=1 or 3) represents a sample value of the voltage at a sampling time point kj, $i_{kj}$ (j=2 or 4) represents a value which is a function of a sample value of the current at a sampling time point kj, and $k1 = n - m - M$
$k2 = n$
$k3 = n - m$
$k4 = n - M$ where m represents an integer equal to the number of sampling operations over an interval equal to a multiple of a half cycle of the system frequency, M represents an integer, and n represents a sampling time point;

wherein the determining means determines the direction for sampling time points n within a predetermined time interval from occurrence of a fault; and (d) means for producing, when the voltage is less than said predetermined threshold and the fault is found to be within a direction of a protection zone, a signal for use as a condition for triggering a fault responsive device.

14. A system according to claim 13, wherein said integer m is equal to the number of sampling operations over an interval equal to a multiple of a full cycle of the system frequency.

15. A system according to claim 14, wherein said multiple is 1.

16. A system according to claim 13, wherein said integer m is equal to the number of sampling operation over an interval equal to an odd number multiple of a half cycle of the system frequency.

17. A system according to claim 16, wherein said multiple is 1.

18. A system according to claim 13, wherein said difference value is used as said value $i_{kj}$ and a sample value at a sampling time point of n−m is used as said value of a current component corresponding to pre-fault power flow.

19. A system according to claim 13, further comprising means for prolonging, for a certain time interval, production of said signal by said means (d), once the fault is found to be in the direction of the protection zone by said means (c) even if it is found thereafter that the voltage is not very small or that the fault is not in the direction of the protection zone.

20. A system according to claim 13, wherein
said means (b) makes the judgement using a sampled instantaneous value of the voltage, and
said means (c) determines the direction in accordance with the polarity of the discriminant D for sampling time points n within a certain time interval from the time when the sampled instantaneous value of the voltage becomes very small.

21. A system according to claim 13,
wherein said means (c) comprises means for successively determining the polarity of the discriminant D,
said system further comprising means for storing the determined polarity in time sequence, and
wherein said means (c) begins, when the voltage is found to be very small by said means (b), the determination of the direction and conducts such determination by referring to the stored polarities determined for the sampling time points n with a certain time interval from an estimated time point of occurrence of a fault.

22. A system according to claim 21, wherein said means (b) makes the judgement using an amplitude of the voltage.

23. A system according to claim 13 wherein $i_{kj}$ represents a difference value obtained by subtracting a value of a current component corresponding to pre-fault power flow from the sample value of the current at the sampling point kj.

24. A system according to claim 13 wherein said predetermined time is less than the time required for the polarity of said determinant to change such that the polarity of said determinant used for determining fault direction is an initial value.

* * * * *